United States Patent
Boday et al.

(10) Patent No.: US 8,765,243 B2
(45) Date of Patent: Jul. 1, 2014

(54) IMPLEMENTING INTERFACE FREE HOSE-TO-BARB CONNECTION

(75) Inventors: Dylan J. Boday, Tucson, AZ (US); Joseph Kuczynski, II, Rochester, MN (US); Jason T. Wertz, Wappinger Falls, NY (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/562,731

(22) Filed: Jul. 31, 2012

(65) Prior Publication Data

US 2014/0035278 A1    Feb. 6, 2014

(51) Int. Cl.
| | | |
|---|---|---|
| B32B 1/08 | (2006.01) | |
| B29C 65/00 | (2006.01) | |
| F16L 11/04 | (2006.01) | |
| F16L 13/10 | (2006.01) | |

(52) U.S. Cl.
USPC ............... 428/36.9; 428/36.92; 285/285.1; 156/305

(58) Field of Classification Search
USPC ............ 428/36.9, 36.92; 285/285.1; 156/294, 156/305
See application file for complete search history.

(56) References Cited

U.S. PATENT DOCUMENTS

| | | | |
|---|---|---|---|
| 1,966,368 A * | 7/1934 | Williams | ............. 285/254 |
| 4,904,136 A | 2/1990 | Matsumoto | |
| 5,375,953 A | 12/1994 | Krug et al. | |
| 5,821,293 A | 10/1998 | Roesch et al. | |
| 6,257,280 B1 | 7/2001 | Marena | |
| 6,889,719 B2 | 5/2005 | Watanabe et al. | |
| 7,086,421 B2 | 8/2006 | Backman et al. | |
| 7,255,134 B2 | 8/2007 | Mahabir et al. | |
| 2009/0045621 A1 | 2/2009 | Heraud et al. | |
| 2009/0098325 A1 | 4/2009 | Uchida et al. | |
| 2009/0162591 A1 | 6/2009 | Doshi et al. | |
| 2009/0174180 A1 | 7/2009 | Lackey | |
| 2010/0038012 A1 | 2/2010 | Tucker et al. | |
| 2010/0108172 A1 | 5/2010 | Liu et al. | |

* cited by examiner

Primary Examiner — Erik Kashnikow
(74) Attorney, Agent, or Firm — Joan Pennington

(57) ABSTRACT

A method and structures are provided for implementing hose-to-barb connections for water cooling hoses. The water cooling hose is assembled with a barbed fitting to create an interface free joint between a hose material and the barbed fitting. The hose material contains microcapsules which contain a catalyst and/or a combination of microcapsules which contain monomer and catalyst in separate microcapsules that promote polymerization when ruptured. The hose material contains functional groups that can be polymerized with a functionality that is contained on the hose surface. This process creates a secure interface free covalent bond, thus preventing leaks from occurring.

8 Claims, 4 Drawing Sheets

IMPLEMENTING INTERFACE FREE HOSE-TO-BARB CONNECTION

FIELD OF THE INVENTION

The present invention relates generally to high performance cooling systems for the data processing field, and more particularly, relates to a method and structures for implementing hose-to-barb connections for water cooling hoses.

DESCRIPTION OF THE RELATED ART

Current high performance computer systems have rapidly migrated to water cooling solutions to effectively remove the massive heat load from the central electronic complex (CEC). The system design typically includes a flexible tubing option incorporating a large number of connections to a cold plate/heat sink. Restrictions on the tubing material choice present a challenge to ensure adequate product reliability.

As designs push to bring cooling inside nodes, reliability becomes a must to prevent catastrophic failure of electrical components. Potential failures can occur where the hose makes connection to a cooling supply barbed fitting. This is known as the hose-to-barb interface.

FIG. 1 illustrates a conventional water cooling hose with a hose-to-barb interface between a barbed fitting and the hose, which is a major area for potential failures.

FIG. 2 illustrates a prior art water cooling hose joint with an adhesive. Using an adhesive creates interfaces between the barbed fitting and the adhesive and the hose and the adhesive. The prior art water cooling hose joint with the adhesive includes additional interface areas for potential failures.

A need exists for a method and structure for implementing improved hose-to-barb connections for water cooling hoses. It is desirable to provide such improved hose-to-barb connections to implement leak prevention of water cooling hoses, improving the reliability of high performance cooling systems.

SUMMARY OF THE INVENTION

Principal aspects of the present invention are to provide a method and structure for implementing leak prevention of water cooling hoses. Other important aspects of the present invention are to provide such method and structure substantially without negative effects and that overcome many of the disadvantages of prior art arrangements.

In brief, a method and structures are provided for implementing hose-to-barb connections for water cooling hoses. The water cooling hose is assembled with a barbed fitting to create an interface free joint between a hose material and the barbed fitting. The hose material contains microcapsules which contain a catalyst and/or a combination of microcapsules which contain a monomer and a catalyst in separate microcapsules that promote polymerization when ruptured. The hose material contains functional groups that are polymerized with a functionality that is contained on the hose surface. This process creates a secure interface free covalent bond, thus preventing leaks from occurring.

In accordance with features of the invention, the hose material is then placed over a barbed fitting having an additional functionality or microcapsules. When the clamp is compressed around the hose material and onto the barb the microcapsules will rupture creating a polymerization reaction between the hose and barbed fitting thus creating the interface free bond connection. This interface free bond connection prevents leaks, thus improving the reliability of the high performance cooling systems.

In accordance with features of the invention, the water cooling hose is formed of a polymer with viscoelasticity, including an ethylene propylene diene monomer (EPDM) hose, which contains, for example, unreacted norbornene or has other functionalities added to it such as triallyisocyante (TAIC) to react with the microencapsulated polymerization catalyst and the microencapsulated monomer. Separately, the barbed fitting is prepared from a selected resin material of a number of resin materials, for example, EPDM. To these resins, other functionalities optionally are added to the barbed fitting resin, such as TAIC for reacting with a polymerization catalyst and monomers.

In accordance with features of the invention, the interface free hose-to-barb connection is created by sliding the hose over the barbed fitting and then clamped in place. The clamping causes the rupturing of the microcapsules and the release of the monomer and polymerization catalyst. The monomer and polymerization catalyst react with functionalities within the hose and barb, thus creating a covalent linkage between the hose and barb to achieve the interface free covalent bond hose-to-barb connection.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and structures are provided for implementing interface free hose-to-barb connections for water cooling hoses including an ethylene propylene diene monomer (EPDM) hose, and a barbed fitting resin, such as EPDM, containing functional groups that can be polymerized with a functionality that is contained on the hose surface. The interface free hose connection is created by sliding the hose over the barbed fitting and then clamping it into place. The clamping causes the rupturing of the microcapsules and the release of the monomer and polymerization catalyst. The monomer and polymerization catalyst react with functionalities within the hose and barb, thus creating a covalent linkage between the hose and barbed fitting. This process creates a secure interface free covalent bond, thus preventing leaks from occurring.

Figure 1:
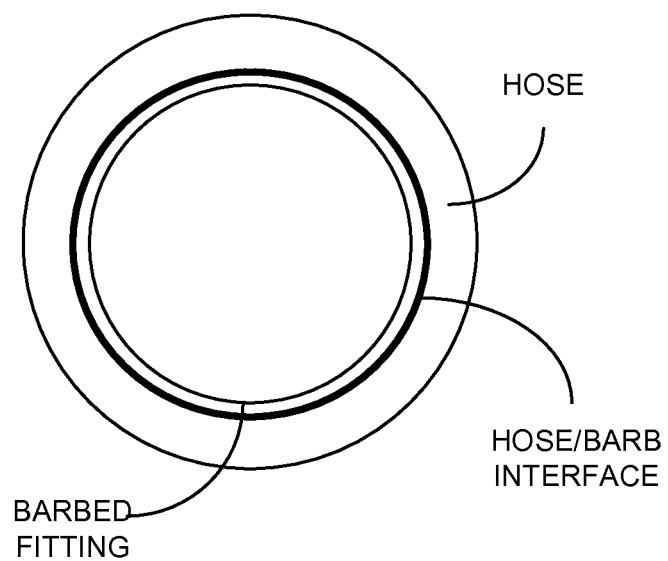
FIG. 1 and FIG. 2 illustrate prior art water cooling hose-to-barb connections.
Figure 2:
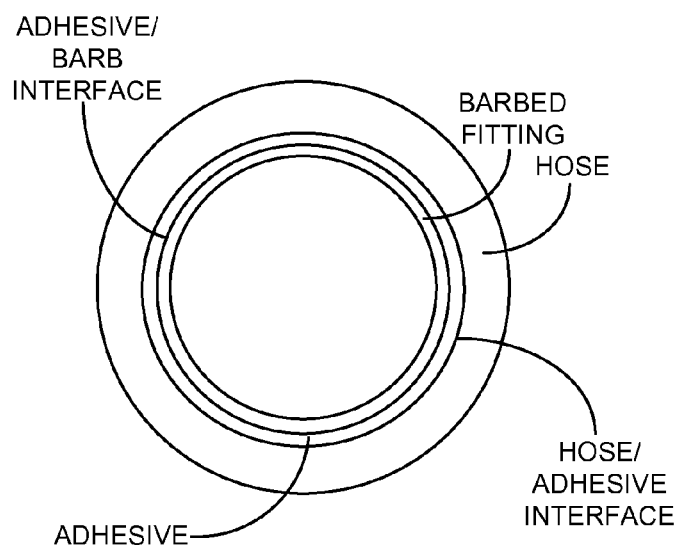
Figure 3:
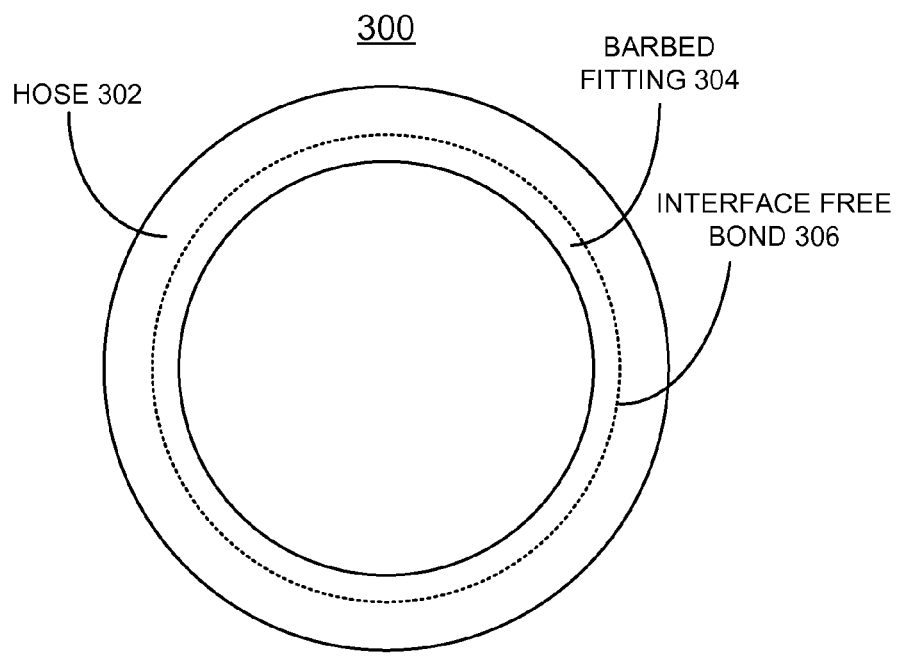
FIG. 3 is a cross-sectional view schematically illustrating not to scale an example interface free hose-to-barb connection in accordance with the preferred embodiment.

Having reference now to the drawings, in FIG. 3, there is shown an example interface free hose-to-barb connection generally designated by the reference character 300 for water cooling hoses in accordance with a preferred embodiment. The interface free hose-to-barb connection 300 includes a hose 302 bonded with a barbed fitting 304 by an interface free hose-to-barb covalent bond 306.

The hose 302 includes optionally an ethylene propylene diene monomer (EPDM) hose. EPDM rubber is a type of synthetic rubber, which is an elastomer or a polymer with viscoelasticity, often used in water cooling applications.

Microcapsules are contained within the hose 302 in accordance with a preferred embodiment. The hose material forming the hose 302 contains microcapsules which contain a catalyst and/or a combination of microcapsules which contain monomer and catalyst in separate microcapsules that promote polymerization when ruptured. The hose material forming the hose 302 includes, for example, EPDM hose that contains unreacted norbornene or may have other functionalities added to it such as triallyisocyante (TAIC) to react with a microencapsulated polymerization catalyst and a microencapsulated monomer.

It should be understood that various other hose materials and functionalities may be chosen by those skilled in the art.

The barbed fitting 304 can be prepared from a selected resin material of a number of resin materials, such as EPDM. To the selected resin, other functionalities can be added to the barbed fitting resin, such as TAIC or other functionalities for reacting with a polymerization catalyst and monomers. It should be understood that various barbed fitting resin materials and functionalities may be chosen by those skilled in the art.

The interface free hose-to-barb covalent bond 306 preferably is created by sliding the hose 302 over the barbed fitting 304, and then clamped into place. The clamping causes the rupturing of the microcapsules contained within the hose 302 and the release of the monomer and polymerization catalyst. The monomer and polymerization catalyst react with functionalities within the hose 302 and the barbed fitting 304, thus creating a covalent linkage between the hose and barbed fitting. A secure interface free covalent bond is created, thus preventing leaks from occurring.

Figure 4:
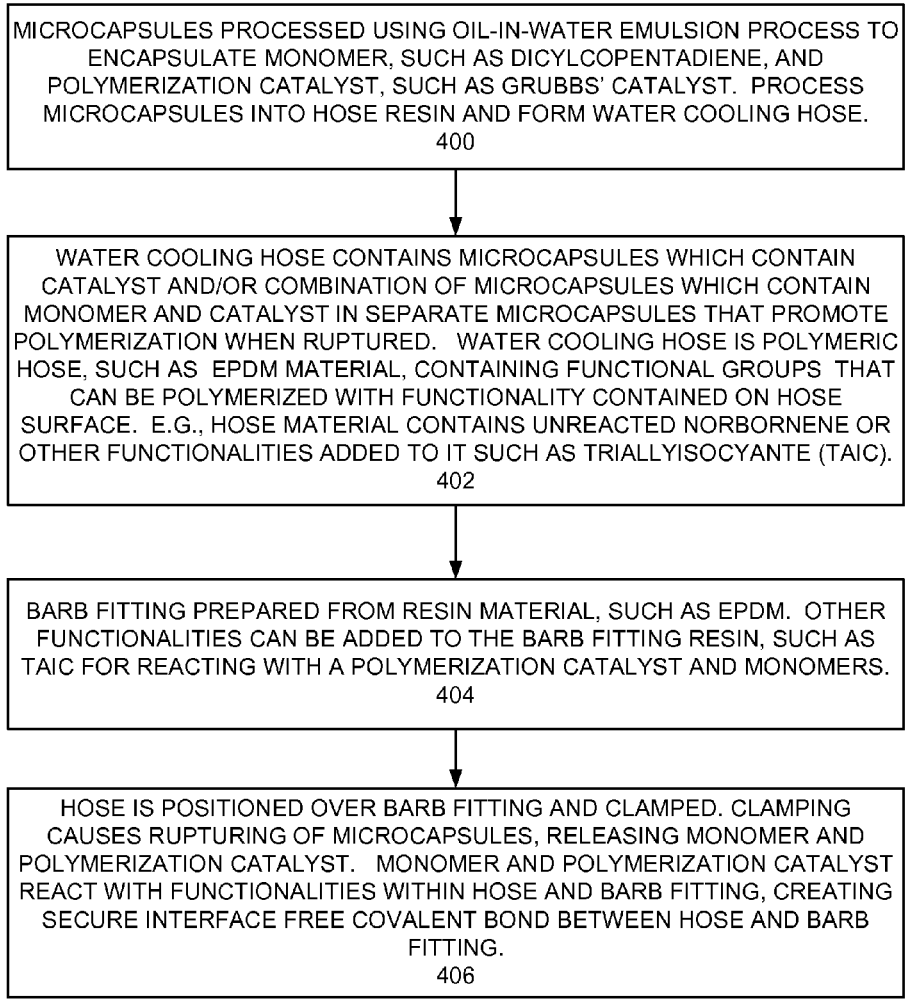
FIG. 4 is a flow chart illustrating exemplary steps for manufacturing a water cooling hose interface free covalent bond hose-to-barb connection in accordance with the preferred embodiment.

Referring to FIG. 4, there is shown a flow chart illustrating example steps for manufacturing interface free hose-to-barb connections for water cooling hoses in accordance with a preferred embodiment.

As indicated at a block 400, microcapsules are processed using an oil-in-water emulsion process to encapsulate a monomer such as dicylcopentadiene and/or a polymerization catalyst, such as Grubbs' catalyst. Other catalysts and monomers may be chosen by those skilled in the art. The microcapsules are then processed into the hose resin and formed into the tube material.

As indicated at a block 402, water cooling hose 302 containing the microcapsules which contain catalyst and/or a combination of microcapsules which contain monomer and catalyst in separate microcapsules, is fabricated. The water cooling hose 302 includes an ethylene propylene diene monomer (EPDM) hose. EPDM rubber is a type of synthetic rubber, which is an elastomer or a polymer with viscoelasticity, often used in water cooling applications.

The hose material contains functional groups that can be polymerized with a functionality that is contained on the hose surface. The tube material for example may be EPDM hose 302 that contains unreacted norbornene and may have other functionalities added to it such as triallyisocyante (TAIC) to react with the microencapsulated polymerization catalyst and the microencapsulated monomer. Other hose materials and functionalities may be chosen by those skilled in the art. The microencapsulated polymerization catalyst and the microencapsulated monomer promote polymerization when ruptured.

As indicated at a block 404, the barbed fitting 304 is prepared from a resin material of a number of resin materials, such as EPDM, and polycarbonate. Other functionalities can be added to the barbed fitting resin, such as TAIC or others for reacting with a polymerization catalyst and monomers.

As indicated at a block 406, the hose 302 is positioned over the barbed fitting 304 and clamped into place. The clamping causes the rupturing of the microcapsules and the release of the monomer and polymerization catalyst. The monomer and polymerization catalyst react with functionalities within the hose 302 and barbed fitting 304, thus creating a covalent linkage between the hose and barb. A secure interface free hose-to-barb covalent bond connection is created in accordance with features of the invention.

While the present invention has been described with reference to the details of the embodiments of the invention shown in the drawing, these details are not intended to limit the scope of the invention as claimed in the appended claims.

What is claimed is:

1. An interface free hose-to-barb connection produced by a method for implementing an interface free hose-to-barb connection for a water cooling hose comprising:
   providing a hose material containing microcapsules for promoting polymerization when ruptured; said microcapsules containing a monomer and a catalyst in separate microcapsules;
   forming the water cooling hose with said hose material containing at least one functional group to be polymerized with a functionality contained on a hose surface; said hose material including an ethylene propylene diene monomer (EPDM), and said EPDM hose containing unreacted norbornene and said functionality contained on the hose surface including triallyisocyante (TAIC);
   providing a barbed fitting;
   positioning and clamping the water cooling hose over said barbed fitting, rupturing said microcapsules and creating a polymerization reaction; and
   said polymerization reaction, creating a secure interface free covalent bond hose-to-barb connection to prevent leaks from occurring.

2. A structure for implementing an interface free hose-to-barb connection for a water cooling hose comprising:
   the water cooling hose formed of a hose material containing microcapsules and containing at least one functional group to be polymerized with a functionality contained on a hose surface; said hose material including an ethylene propylene diene monomer (EPDM), and said EPDM hose containing unreacted norbornene and said functionality contained on the hose surface including triallyisocyante (TAIC);
   a barbed fitting received in the water cooling hose; and a secure interface free covalent bond connection between the water cooling hose and said barbed fitting to prevent leaks from occurring.

3. The structure as recited in claim 2 wherein said microcapsules contain a polymerization catalyst.

4. The structure as recited in claim 2 wherein said microcapsules contain a monomer.

5. The structure as recited in claim 2 wherein said barbed fitting is formed of a selected resin including ethylene propylene diene monomer (EPDM).

6. A structure for implementing an interface free hose-to-barb connection for a water cooling hose comprising:
the water cooling hose formed of a hose material containing microcapsules and containing at least one functional group to be polymerized with a functionality contained on a hose surface;
a barbed fitting received in the water cooling hose; said barbed fitting being formed of a selected resin including ethylene propylene diene monomer (EPDM), said barbed fitting includes a functionality added to said selected resin including triallyisocyante (TAIC) a secure interface free covalent bond connection between the water cooling hose and said barbed fitting to prevent leaks from occurring.

7. The structure as recited in claim 6 wherein said microcapsules contain a polymerization catalyst and wherein said secure interface free covalent bond connection between the water cooling hose and said barbed fitting is formed by rupturing of said microcapsules releasing the polymerization catalyst, reacting with functionalities of the hose and said barbed fitting.

8. The structure as recited in claim 6 wherein said microcapsules contain a combination of microcapsules containing a polymerization catalyst and microcapsules containing a monomer, and wherein said secure interface free covalent bond connection between the water cooling hose and said barbed fitting is formed by rupturing of said microcapsules releasing the monomer and polymerization catalyst, reacting with functionalities of the hose and said barbed fitting.

* * * * *